United States Patent [19]

Faroudja

[11] Patent Number: 4,837,611
[45] Date of Patent: Jun. 6, 1989

[54] WIDEBAND NTSC-COMPATIBLE TRANSMISSION SYSTEM WITH NOISE REDUCTION PROCESSING

[76] Inventor: Yves C. Faroudja, 26595 Anacapa Dr., Los Altos Hills, Calif. 94022

[21] Appl. No.: 151,895

[22] Filed: Feb. 3, 1988

[51] Int. Cl.[4] .................. H04N 11/12; H04N 11/14
[52] U.S. Cl. ........................................ 358/12; 358/16
[58] Field of Search .............................. 358/12, 15, 16

[56] References Cited

U.S. PATENT DOCUMENTS

| | | | |
|---|---|---|---|
| 4,262,304 | 4/1981 | Faroudja | 358/37 |
| 4,521,803 | 6/1985 | Gittinger | 358/12 |
| 4,641,179 | 2/1987 | LoCicero et al. | 358/16 |

FOREIGN PATENT DOCUMENTS

| | | | |
|---|---|---|---|
| 852512 | 10/1960 | United Kingdom | 358/16 |
| 2075790 | 11/1981 | United Kingdom | 358/16 |
| 2126822 | 3/1984 | United Kingdom | 358/12 |

OTHER PUBLICATIONS

Herold, A Compatible High–Resolution TV System for Cable Casting, Proceedings of the IEEE, Jul. 1970, pp. 1013–1015.
Compatible High Definition Television Broadcast Systems, T. S. Rzeszewski, M. Pazarci, and J. L. LoCicero.

*Primary Examiner*—John W. Shepperd
*Attorney, Agent, or Firm*—David B. Harrison

[57] ABSTRACT

A method and apparatus for encoding and detecting a wide band quadrature modulated color television signal which is NTSC format compatible is disclosed. The encoding steps include: generating an amplitude modulated radio frequency carrier; generating a first sideband of the carrier comprising limited bandwidth luminance information and a quadrature modulated chroma subcarrier; adaptively preemphasizing low level signal transitions occurring in extended bandwidth luminance information, and generating a second sideband of the carrier comprising the adaptively preemphasized extended bandwidth luminance information without addition or presence of the chroma subcarrier. The detection steps are: separating the second sideband of the carrier from the first sideband of the carrier and detecting the second sideband in order to recover the extended bandwidth luminance information; demodulating the quadrature modulated chroma subcarrier within the separated first sideband in order to recover chrominance information, deemphasizing the low level signal transitions in the detected extended bandwidth luminance information to put out restored extended bandwidth luminance information; and putting out the chrominance information and the restored extended bandwidth luminance information for further processing and display with a television picture display device.

7 Claims, 7 Drawing Sheets

TRANSMISSION SPECTRUM WITH NARROW
UPPER LUMINANCE SIDEBAND

TRANSMISSION SPECTRUM WITH WIDE
UPPER LUMINANCE SIDEBAND

WIDEBAND LUMINANCE
SPECTRUM GENERATOR 30

WIDEBAND LUMINANCE
SPECTRUM GENERATOR 100

FILTERS USED ON
FIG. 3, 6, AND 8 DIAGRAMS

FILTER F5 USED
ON FIGURE 6 DIAGRAM

CONVENTIONAL RECEIVER
DESIRABLE IF RESPONSE.

PRIOR ART

LUMINANCE HIGH FREQUENCIES

ALTERNATIVE DE-EMPHASIS IMPLEMENTATION

HORIZONTAL DE-EMPHASIS

WIDEBAND NTSC-COMPATIBLE TRANSMISSION SYSTEM WITH NOISE REDUCTION PROCESSING

FIELD OF THE INVENTION

The present invention relates to television signal processing systems and methods. More particularly, the present invention relates to television signal processing systems including noise reduction processes using a spectrum having a significantly greater bandwidth than a conventional NTSC spectrum while remaining downward compatible with equipment designed to handle the conventional NTSC spectrum.

BACKGROUND OF THE INVENTION

Conventional broadcast NTSC composite color subcarrier television signals nominally occupy assigned broadcast channels which are 6 MHz wide. The visual (AM) carrier frequency is nominally 1.25 MHz above the lower boundary of the channel. The aural carrier frequency (FM) is centered 4.5 MHz above the visual carrier frequency; and the chrominance subcarrier is 3.579545 MHz above the visual carrier frequency.

As is well known, since the color subcarrier frequency an odd multiple of one half of the line scan rate, the sideband signals carrying the chrominance information exist as energy groups which are interleaved within the high frequency energy groups of luminance. When the chrominance and luminance energy groups overlap spectrally, the resultant picture display may be characterized by cross-color artifacts and cross-luminance artifacts. Such artifacts may be noticeably reduced by comb filter encode and decode processing, such as is taught in the present inventor's U.S. patent application No. 07/017,166 filed on Feb. 20, 1987, now U.S. Patent No. 4,731,660.

Recently, with the advent of improvements in television picture display systems, workers in the art have proposed a wide variety of improved resolution television systems, one of which is known as "high definition television or 'HDTV'" which proposes new transmission standards, typically 1050 scan lines, which are not immediately compatible with existing television receiving devices. Scan line doubling techniques, such as described in U.S. Pat. No. 4,719,644, are also known in the prior art as a way to increase virtual resolution.

One other, pertinent proposal is that set forth in an article co-authored by Rzeszewski, Pazarci and LoCicero entitled "Compatible High-Definition Television Broadcast Systems", *IEEE Trans. on Broadcasting*, Dec. 1987 issue. That article sets forth systems using two standard, adjacent 6 MHz channels and which were capable of increased horizontal and vertical resolution, a wider aspect ratio and reduced cross-talk between the various components of the composite signal. The luminance signal is given the benefit of over 7 MHz of bandwidth, which results in a much sharper picture image display. Thus, it is presently known to employ a 12 MHz spectrum for carrying a bandwidth increased, NTSC compatible, quadrature modulated color subcarrier signal. Resolutions approaching those obtainable with 35 millimeter format film are realistically obtainable with some of these bandwidth extending techniques. In such two-channel systems it is desirable that the channels be adjacent channels (a situation realistically available in the cable television industry, and also in the UHF broadcast spectrum). Also, it is highly desirable that the two-channel signal be capable of being received on conventional television receivers with little or no apparent degradation in picture quality. Further, it is highly desirable that luminance and chrominance components be separated with e.g. comb filter processing so that cross-color and cross-luminance artifacts are thereby eliminated and thereupon provided as separate outputs to the more recent "S-VHS" television receivers having the capability of receiving and processing luminance and chrominance separately. It is also desirable that the two-channel system provide composite video and modulated RF outputs.

The present inventor has discovered increased resolution provided by two-channel television systems solves but one aspect of a multi-faceted problem. Most of the facets of this problem do not relate to resolution. Rather, most relate to unwanted noise and interference artifacts, such as short term ringing and echo due to vistigial sideband filter group delay errors, and ghosts from multipath transmission phenomena.

In cable television systems the apparent defects of the NTSC format, such as cross-color, cross-luminance artifacts and lack of resolution are of less concern than the more pressing problems of adjacent channel interference, noise and short term ghosts and ringing (300–500 nanosecond duration) due to deficient line terminations associated with distribution amplifiers in local distribution loops. Existing cable television systems lend themselves directly to the use of two adjacent 6 MHz channels for pay television services offering the highest in technical quality, such as movie channels, where it is desirable to reproduce pictures with a quality comparable to the picture quality experienced in theaters.

Thus, a hitherto unsolved need has existed for a wide RF bandwidth (12 MHz) television spectrum which is compatible with the NTSC format spectrum and which also delivers an image which is free of noise, interference, and short term ringing.

SUMMARY OF THE INVENTION WITH OBJECTS

A general object of the present invention is to overcome limitations and drawbacks of the prior art by providing a wide RF bandwidth television spectrum signal which is NTSC compatible and which also delivers a picture image to the television receiver in which noise, interference and short term ringing artifacts have been reduced or eliminated entirely.

The present invention provides a method for generating for transmission through a medium a wide band quadrature modulated color television signal spectrum with NTSC format compatibility. This new method comprises the steps of:

generating an amplitude modulated radio frequency carrier, generating a first sideband of the carrier comprising limited bandwidth luminance information, and a quadrature modulated chroma subcarrier interleaved with the luminance information within the first sideband, adaptively preemphasizing low level signal transitions occurring in extended bandwidth luminance information, and generating a second sideband of the carrier comprising said adaptively preemphasized extended bandwidth luminance information without addition of the chroma subcarrier.

As an aspect of the present invention, the quadrature modulated chroma subcarrier is interleaved among high frequency energy groups of the limited bandwidth luminance information.

As another aspect of the present invention, a frequency modulated audio subcarrier is generated at a frequency spaced spectrally away from the amplitude modulated radio frequency carrier in the direction of the first sideband.

As a further aspect of the present invention, the step of adaptively preemphasizing low level signal transitions occurring in extended bandwidth luminance information comprises the further steps of:

boosting low level transitions in the vertical domain within the extended bandwidth luminance information to provide a boosted vertical component, boosting low level transitions in the horizontal domain within the extended bandwidth luminance information to provide a boosted horizontal component, and combining in proper time an unboosted component of the extended bandwidth luminance information with the boosted vertical component and with the boosted horizontal component.

The present invention further comprises a method for detecting a wide band quadrature modulated color television signal which is NTSC format compatible and which has been generated by the steps of (1) generating an amplitude modulated radio frequency carrier; (2) generating a first sideband of said carrier comprising limited bandwidth luminance information; (3) generating a quadrature modulated chroma subcarrier within the first sideband; (4) adaptively preemphasizing low level signal transitions occurring in extended bandwidth luminance information, and (5) generating a second sideband of the carrier comprising the adaptively preemphasized extended bandwidth luminance information without addition of the chroma subcarrier, the detection method comprising the steps of:

separating the second sideband of the carrier from the first sideband thereof, and detecting the second sideband in order to recover the extended bandwidth luminance information;

demodulating the quadrature modulated chroma subcarrier within the separated first sideband in order to recover chrominance information, deemphasizing the low level signal transitions in the detected extended bandwidth luminance information to put out restored extended bandwidth luminance information; and putting out the chrominance information and the restored extended bandwidth luminance information for further processing and display with a television picture display device.

These and other objects, aspects, advantages and features of the present invention will be more fully understood and appreciated by considering the following detailed description of a preferred embodiment, presented in conjunction with the accompanying drawings.

DETAILED DESCRIPTION OF PREFERRED EMBODIMENTS

Figure 1:
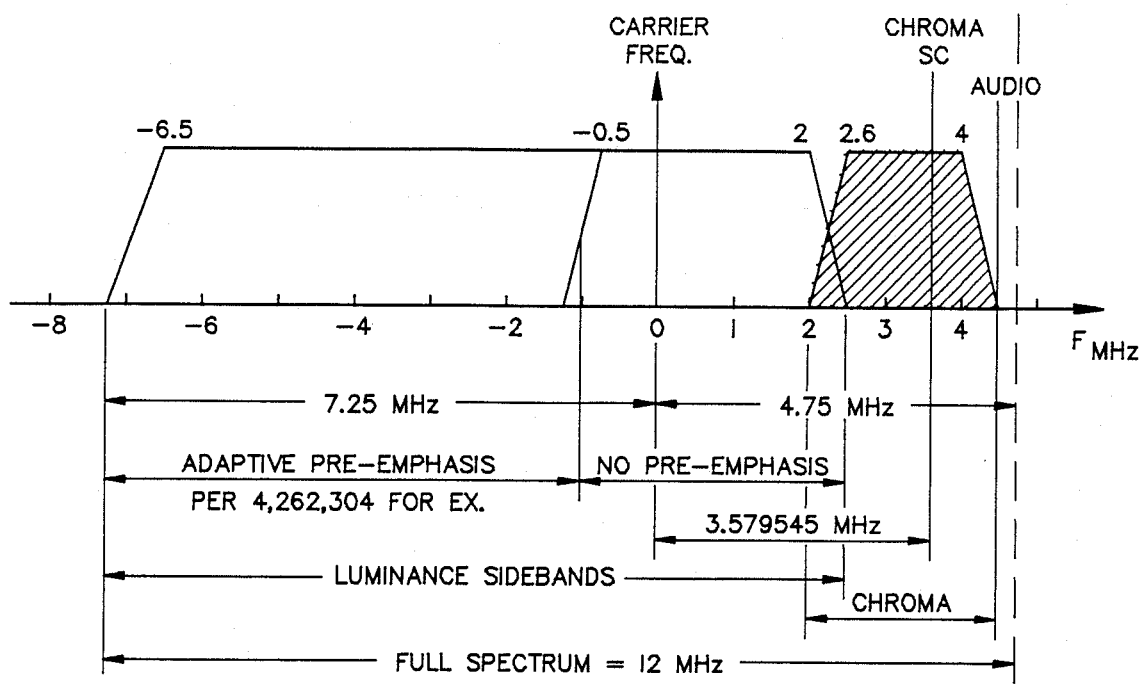
FIG. 1 is a graph of a wideband television transmission spectrum in accordance with the present invention which is NTSC compatible and which has an attenuated luminance upper sideband and which has adaptive preemphasis of the full spectrum luminance lower sideband.

With reference to FIG. 1, a two-adjacent-transmission-channel television spectrum is depicted as occupying 12 MHz of radio frequency spectrum. The television carrier frequency is noted at 0 MHz on the abscissa. The spectrum extends in the positive direction for 4.75 MHz, and it extends in the negative direction for 7.25 MHz.

In the FIG. 1 spectrum, the luminance upper sideband has been attenuated beginning at approximately 2 MHz and ending at approximately 2.5 MHz, while the color subcarrier effectively ends at 2 MHz. Thus, there is very little spectral overlap between luminance and chrominance. This FIG. 1 transmission spectrum is fully compatible with NTSC single channel receivers. However, only the spectrum from −1.5 to 4.75 MHz will be effectively utilized by such conventional receivers. When the FIG. 1 spectrum is presented on a conventional NTSC receiver, the resultant picture will be free of cross-color and cross-luminance artifacts, but will have a slightly degraded horizontal resolution when compared with the performance usually obtained with a conventional 6 MHz single channel. (Unless the receiver is provided with a comb filter chroma/luminance separator circuit, it will probably employ a trap circuit to eliminate cross-color and cross-luminance artifacts. The NTSC compatible performance obtainable from the FIG. 1 spectrum is then directly equivalent to the performance generally obtainable from receivers employing such trap circuits).

Figure 8:
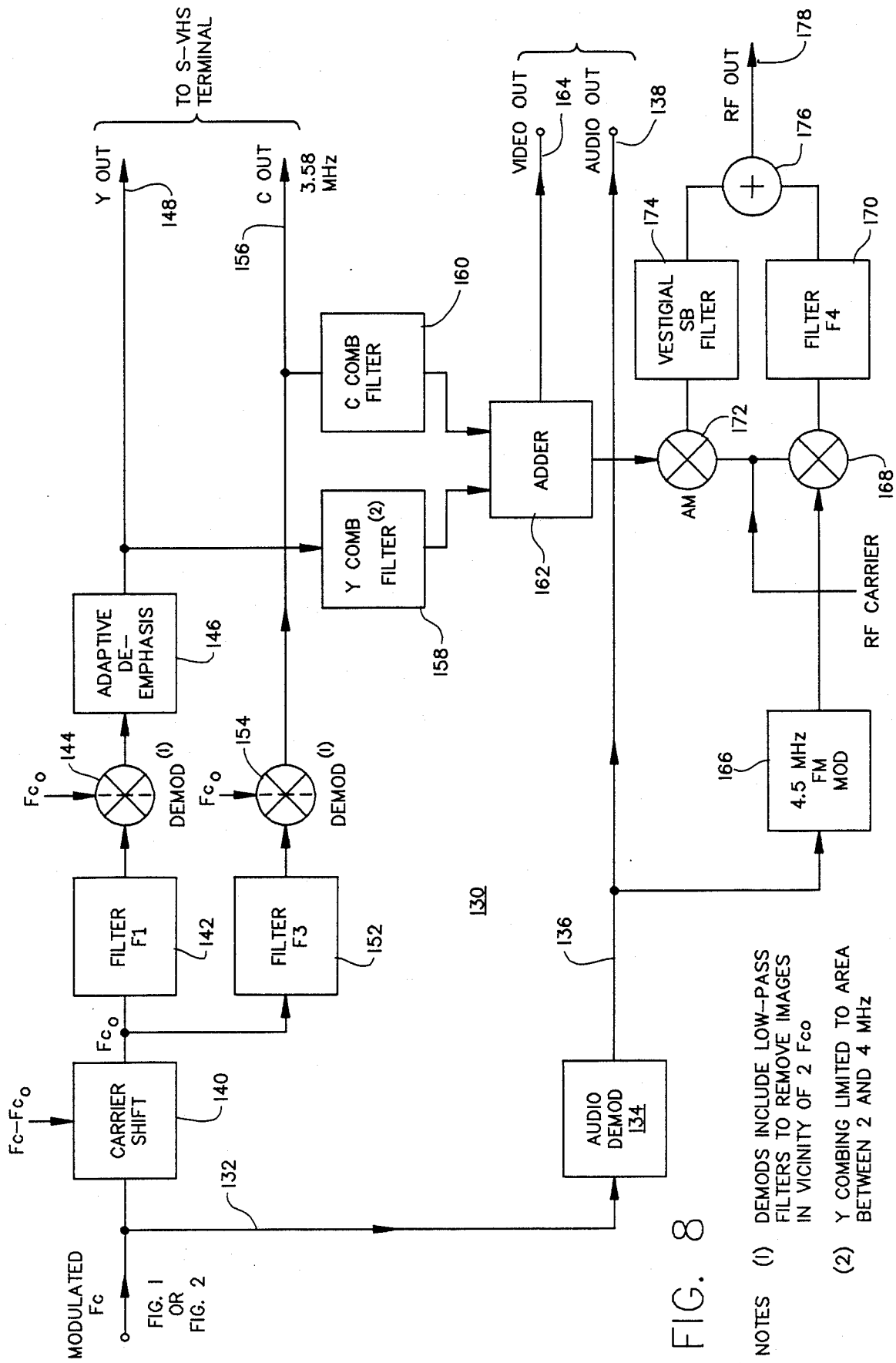
FIG. 8 is a block diagram illustrating one presently preferred decoder for decoding either the FIG. 1 or FIG. 2 spectrum at the television receiver location.

With suitable adaptation, such as the FIG. 8 circuit, the entire benefit of the two-channel spectrum may be obtained. As is apparent from FIG. 1 the luminance spectrum includes energy groups as high as −7.25 MHz which are present in the lower sideband. Since there is virtually no overlap between the chroma and the luminance in the upper sideband, and since there is no mirror image of chroma in the lower sideband whatsoever, the resultant high resolution picture signal is virtually free of cross-color and cross-luminance artifacts.

The inclusion of an adaptive preemphasis process for most of the luminance lower sideband (−1.25 to −7.25 MHz) at the encode end, and a corresponding adaptive de-emphasis at or within an improved television receiver, results in an overall 12 DB to 18 DB improvement in luminance signal to noise ratio (and e.g. ringing, interference and short term ghosts as well), providing the receiver uses only the luminance lower sideband information. An encode process for both the horizontal and vertical low level signal domains is disclosed, for example, in conjunction with FIG. 7 of the inventor's prior U.S. Pat. No. 4,262,304, the disclosure of said patent hereby being incorporated by reference.

Additionally, if the improved television receiver is equipped with line doubling circuitry, the FIG. 1 spectrum may readily be transposed to a scan rate of 1050 lines without conventional loss of resolution or other picture degradation. Should it be desired to provide additional high definition picture information, low frequency vertical differences or horizontal energy groups lying above 7.2 MHz, filtered in packets of e.g.

$$\frac{2N+1}{2} fh)$$

may be folded into the lowermost portion of the luminance lower sideband; this lowermost portion being prefiltered into packets of energy at Nfh, so that the two signals do not overlap.

Also, it will be appreciated by those skilled in the art that a mirror image spectrum of the FIG. 1 spectrum is equally useable with the same results. The only drawback of such an approach is that it is wholly inconsistent with the NTSC signal format. However, in certain circumstances such a non-compatible signal format may have certain advantages (pay television on cable, etc.)

Figure 2:
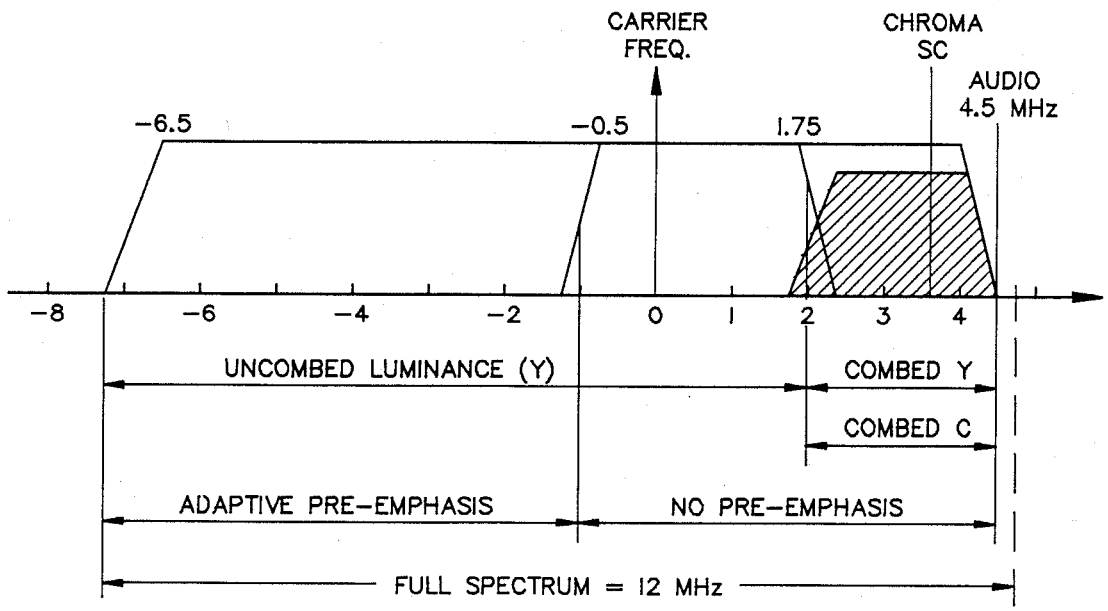
FIG. 2 is a graph of a wideband television transmission spectrum in accordance with the present invention which is NTSC compatible and which has a conventional full luminance upper sideband and which has adaptive preemphasis of the full spectrum luminance lower sideband.

The FIG. 2 spectrum is equivalent to the spectrum depicted in FIG. 1, except that it provides improvements in compatibility with conventional NTSC receivers. It also requires more effort and expense to generate. In this spectrum, the luminance upper sideband extends to +4.2 MHz. In order for this spectrum to be used most efficiently, encode precombing of luminance and chrominance is highly desirable. Such processes are disclosed, for example, in the inventor's referenced U.S. patent application Ser. No. 07/017,166 filed on Feb. 20, 1987, now U.S. Pat. No. 3,731,660, the disclosure of which is hereby incorporated by reference.

Thus, the FIG. 2 transmission spectrum is fully compatible with existing NTSC receivers in the range of −1.25 MHz to +4.5 MHz. And, if such receivers have a comb filter separator for luminance and chrominance, the resultant picture will not suffer from loss of luminance resolution, as is the situation with the FIG. 1 spectrum.

Figure 3:
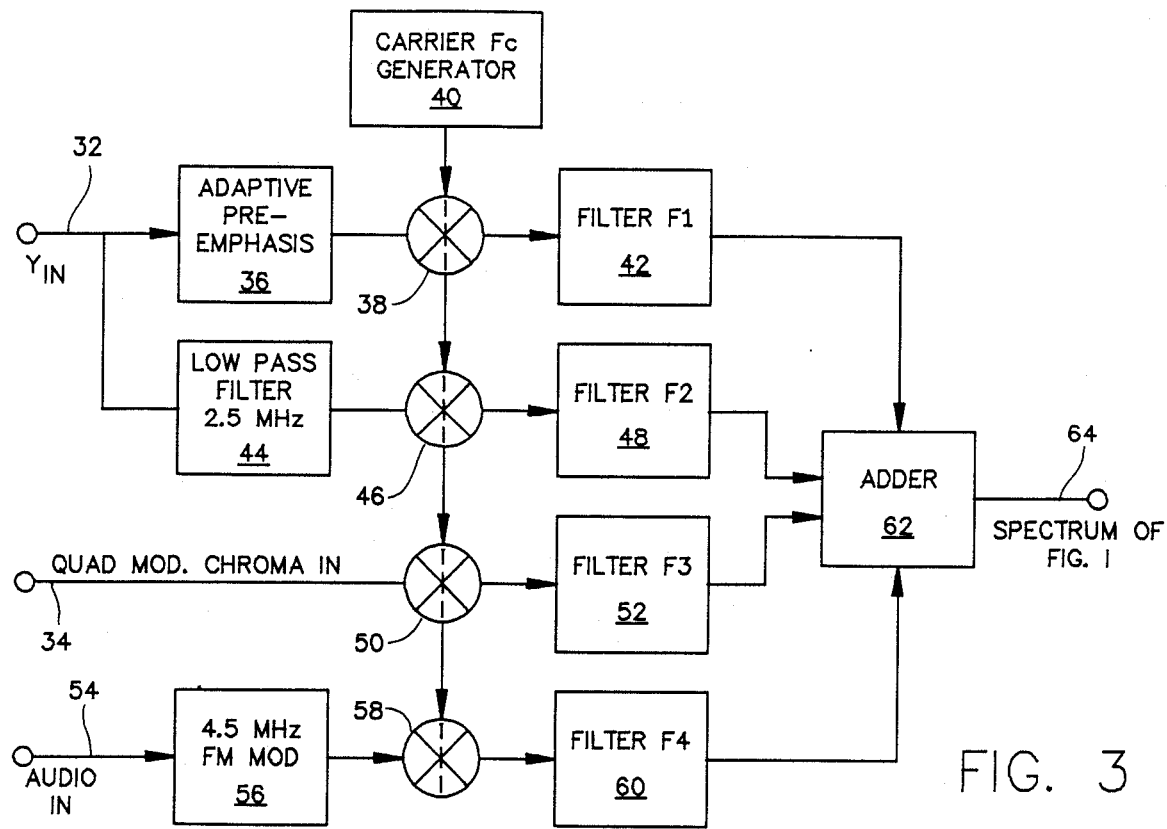
FIG. 3 is a block diagram illustrating one presently preferred encoder for generating the FIG. 1 television transmission spectrum.
Figure 4:
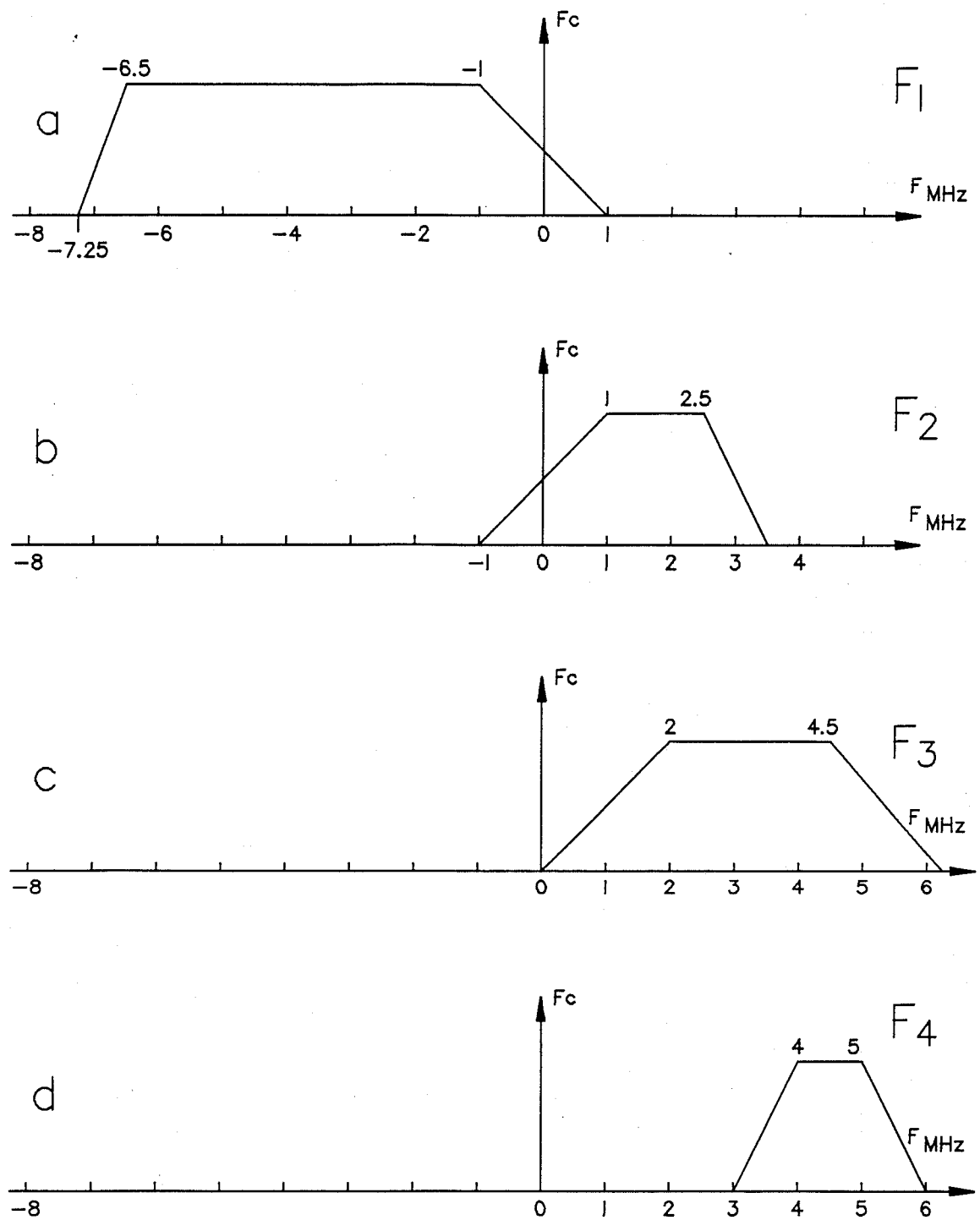
FIG. 4 is a series of graphs of filter characteristics for filters included in the systems depicted in FIGS. 3, 6 and 8.

With reference to FIG. 3 an encoder 30 includes a luminance input 32 which is coming from e.g. an RGB matrix of a color encoder (not shown). A chrominance input 34 also receives chrominance coming from the matrix and a chroma subcarrier modulator. The luminance at the input 32 splits into two paths. The first path is through an adaptive preemphasis circuit 36 and a carrier modulator circuit 38 which double sideband modulates a radio frequency carrier Fc. The carrier frequency Fc is generated by a radio frequency carrier generator circuit 40. The double sideband output from the modulator 38 is passed through a vestigial sideband filter F1 42. The F1 filter 42 has a passband spectrum as depicted in FIG. 4A which passes the lower sideband and which eliminates the upper sideband at about +1 MHz. The minus 40 DB upper roll off characteristic of the F1 filter 42 is very smooth and extends from 1 MHz to +1 MHz.

Luminance from the luminance input 32 is also passed through a low pass filter 44 having an upper cutoff frequency of approximately 2.5 MHz. The low pass filtered luminance is then converted to double sideband modulation by a carrier modulator circuit 46. The lower sideband is eliminated by a filter F2 circuit 48 which has the characteristics set forth in FIG. 4B. It should be noted that the lower rolloff characteristic of the F2 filter 48 is complementary to the upper rolloff characteristic of the F1 filter 42.

Quadrature modulated chrominance information on the input 34 is converted to double sideband modulation by a carrier 1 modulator circuit 50 and then passed through a filter F3 circuit 52 which has the bandpass characteristics graphed in FIG. 4c. The F3 filter essentially eliminates the lower sideband modulation product. The bandpass of the F3 filter 52 is greater than the expected bandwidth of the chroma information so that it does not reduce in any way the energy level of the chroma. Any luminance information which may be passed by the F3 filter circuit 52 will be eliminated by filters within the television set.

Audio on an input 54 is passed through a frequency modulator circuit 56 which frequency modulates the audio about a 4.5 MHz center frequency in conventional fashion. The resultant FM is then converted into double sideband modulation by a fourth carrier modulator circuit 58 and then passed through a filter F4 circuit 60 having the bandpass characteristics graphed in FIG. 4d. The F3 filter essentially eliminates the lower sideband modulation product.

The four filtered components from the F1, F2, F3 and F4 filter circuits 42, 48, 52 and 60 are then combined in proper phase and delay relationship in an adder circuit 62 to produce a spectrum having the characteristics depicted in FIG. 1, i.e, an extended bandwidth luminance lower sideband; and, a limited bandwidth (2.5 MHz) luminance upper sideband which also includes the color subcarrier and the audio information. The F2 filter is effective to remove most of the high frequency energy groups of luminance information of the upper sideband from the vicinity of the chrominance subcarrier, thereby eliminating substantially the potential for cross-color and cross-luminance artifacts at very low cost with the slight drawback in conventional NTSC reception of reduced luminance bandwidth (reduction of picture detail sharpness). With full bandwidth reception which uses the lower sideband preemphasized luminance, the resultant picture is extremely crisp and not only devoid of cross-color and cross- luminance interference, but also noise, ringing and short term ghosts.

Figure 6:
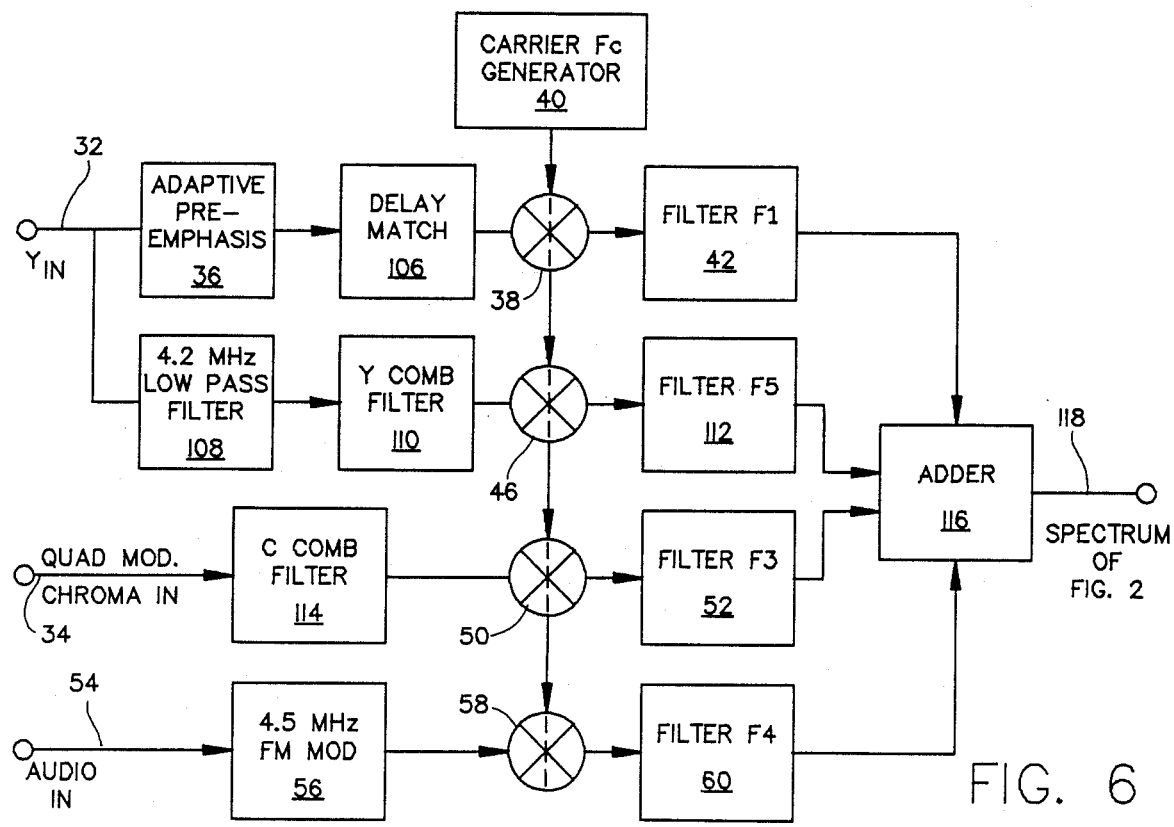
FIG. 6 is a block diagram illustrating one presently preferred encoder for generating the FIG. 2 television transmission spectrum.

A wideband luminance generation circuit 100, depicted in FIG. 6, is effective for generating the spectrum depicted in FIG. 2 Structural elements which are the same as those employed in the circuit 30 of FIG. 1 bear the same reference numerals.

In the first or lower sideband extended bandwidth luminance path, the adaptive preemphasis circuit 36 is followed by a delay matching circuit 106 which is tailored to match the delay of the second, upper sideband luminance path.

Figure 5:
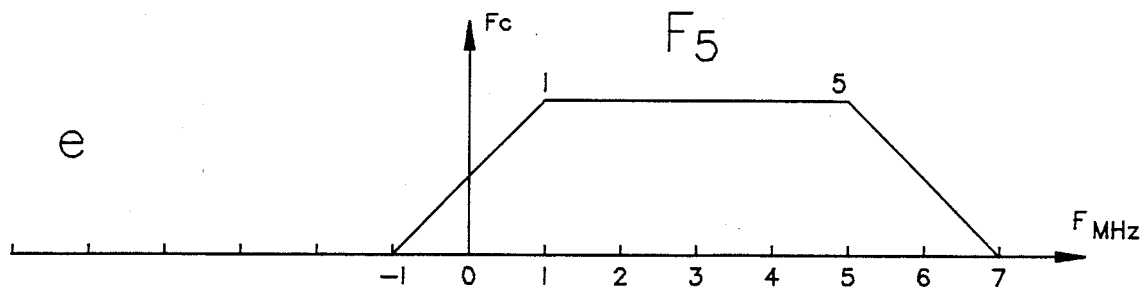
FIG. 5 is a graph of a filter characteristic for a filter included within the FIG. 6 apparatus.

The second, upper sideband luminance path begins at a 4.2 MHz low pass filter 108 which eliminates luminance energy groups above the 4.2 MHz cutoff frequency. Then, the filtered luminance passes through a luminance comb filter 110. The comb filter 110 is operative for combing luminance energy groups above 2 MHz and it may be of the 2 H delay configuration as disclosed in the referenced U.S. patent application Ser. No. 07/017,166. The combed luminance is then passed through the modulator circuit 46 and then passed through an upper sideband vestigial filter F5 circuit 112 which has a 5 MHz passband characteristic as depicted in the FIG. 5 graph. This F5 filter 112 eliminates the lower sideband signal, particularly in the high frequency (picture detail) region of the spectrum.

The quadrature modulated chroma on the input 34 passes through a chroma comb filter 114 and is then modulated and filtered as with the system 30. The audio channel is also identical with the audio path of the system 30.

The four components from the filters 42, 112, 52 and 60 are combined in an adder circuit 116 to produce an output on the line 11 which is the FIG. 2 spectrum. The NTSC compatible, extended luminance bandwidth spectrum of FIG. 2 is then transmitted via a transmission medium, such as a broadcast channel or on a cable television channel.

At the receiving end, if a conventional NTSC receiver is tuned to the carrier frequency Fc and receives the transmitted spectrum, it is apparent that the receiver will ignore the adaptively preemphasized lower sideband component, but will receive the upper sideband component and process it as it would a conventional 6 MHz television channel. If the receiver is equipped with a simple comb filter chroma/luminance separator circuit, the resultant picture will be a state of the art NTSC superior picture image, free of cross-color and cross-luminance interference.

FIG. 8 depicts a wideband luminance detector and interface circuit 130 which is intended to be a stand-alone signal processor at the receiving end, or which may be integrally contained within a television set or video cassette recorder. A carrier Fc modulated with luminance, chroma and sound information, such as the spectrum depicted in FIG. 1 or FIG. 2, enters the detector 130 at an input 132. Audio is demodulated via a conventional audio demodulator circuit 134 and put out on a line 136 which extends to an audio output jack 138. Alternatively, the audio may be transcoded to a reference frequency and demodulated within the television set or video cassette recorder, in a manner well known to those skilled in the art.

The modulated carrier at the input 132 also may pass through a frequency translation circuit 140 which shifts the carrier frequency Fc to a reference frequency Fco, such as channel three or channel four, for example. At the output of the frequency shift circuit 140, the spectrum is the same as e.g. FIG. 2. The upper and lower sidebands are then separated. The lower sideband passes throuqh a filter F1 circuit 142 having the same characteristic as the filter 42. The filter 142 removes the upper sideband, chrominance information and audio subcarrier, leaving only the lower sideband which contains the enhanced bandwidth luminance information. This information is recovered by a carrier demodulator circuit 144 which receives a reference carrier signal Fco from a reference carrier signal generator (not shown). The demodulated, extended bandwidth luminance then passes through an adaptive de-emphasis processor 146 which preferably operates in both the horizontal and vertical domains in a manner which is complementary with the processing provided luminance output 148 provides luminance which has a bandwidth of 7.2 MHz, which is free of cross-color and cross-luminance information, and which is also free of noise, ringing and short term echo and ghost artifacts.

The shifted carrier signal from the circuit 140 also passes through a chrominance filter 152 which has the same characteristics as the F3 filter 52 discussed previously in order to pass the chrominance spectral passband to a demodulator circuit 154. The chroma demodulator circuit 154 puts out quadrature modulated chroma information at the chroma subcarrier frequency (3.9758 MHz) to an output 156. The extended bandwidth luminance output 148 and the chroma output 156 may be connected directly to suitable jacks of an S-VHS television receiver or VCR. The picture quality resulting from this arrangement (given a high resolution display device) will be much better than the highest quality NTSC signal, as the luminance will have almost twice the NTSC bandwidth and have a superior signal to noise ratio due to the complementary preemphasis/-deemphasis processes. The chrominance will be essentially free of cross-luminance artifacts.

If only a video input is available on the display or record device, luminance and chroma must be suitably recombined. In order to carry out a recombination, preferably, a luminance comb filter 158 is connected to the luminance output line 148 and a chroma comb filter 160 is connected to the chroma output line 156. Combed luminance and combed chrominance are then combined in proper time and phase in an adder circuit 162 in order to provide a composite video output at a jack 164. The video jack 164 and audio jack 138 may be used for direct connection to television receivers and VCRs having video and audio input jacks If cost constraints limit features of the interface 130, the chroma comb filter 160 may be omitted with the result that some slight cross-luminance (dot crawl) may be present in the resultant picture signal at the jack 164, although the vertical chrominance transitions will be sharper without combing.

In order to provide a radio frequency output carrying both sound and picture information, on a reference carrier Fco (channel three, for example) additional circuitry may be provided within the interface 130. A 4.5 MHz frequency modulation circuit 166 frequency modulates the audio on the line 136 and passes it to an RF carrier modulator 168 whereupon it is modulated upon the reference carrier Fco and then passed through a filter circuit 170 having the F4 filter 60 passband characteristics previously discussed. The composite video on the line 164 is then modulated in a carrier modulator 172 and then passed through a vestigial sideband filter 174 having a passband characteristic similar to the F5 graph of FIG. 5. The modulated audio and modulated/-filtered video components are then combined in an adder circuit 176 and passed as a radio frequency signal to an output jack 178. With the vestigial sideband filter 174, the output at the jack 178 will be very close to NTSC format standards and will be useable by equipment designed for receiving television broadcast signals in accordance with the NTSC format, a nominal passband graphed in FIG. 7 in the present patent.

Figure 7:
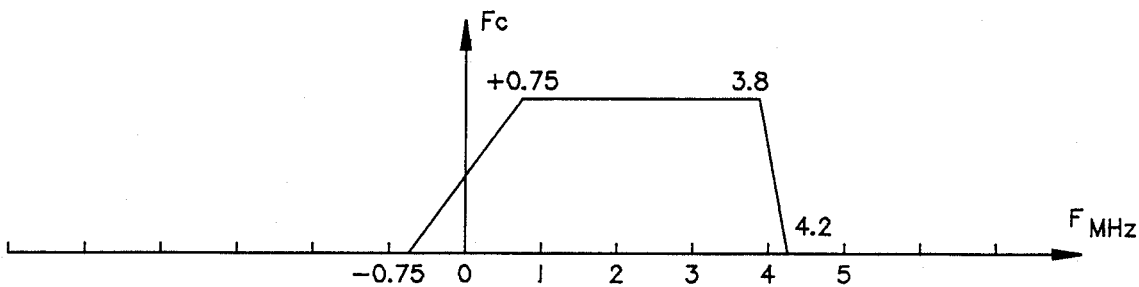
FIG. 7 is a graph of desirable intermediate frequency amplifier path response for a conventional television receiver.

FIG. 7 of the referenced U.S. Pat. No. 4,262,304 depicts an encoder circuit 300 which includes a vertical low level expansion circuit 308 and a horizontal low level expansion circuit 310. This is the preferred implementation for generating the desired spectrum of the present invention. The deemphasis circuitry should mirror the preemphasis circuitry, so that the output signal is essentially unchanged from the input signal, save for a very significant reduction of noise and other short term artifacts.

Figure 9:
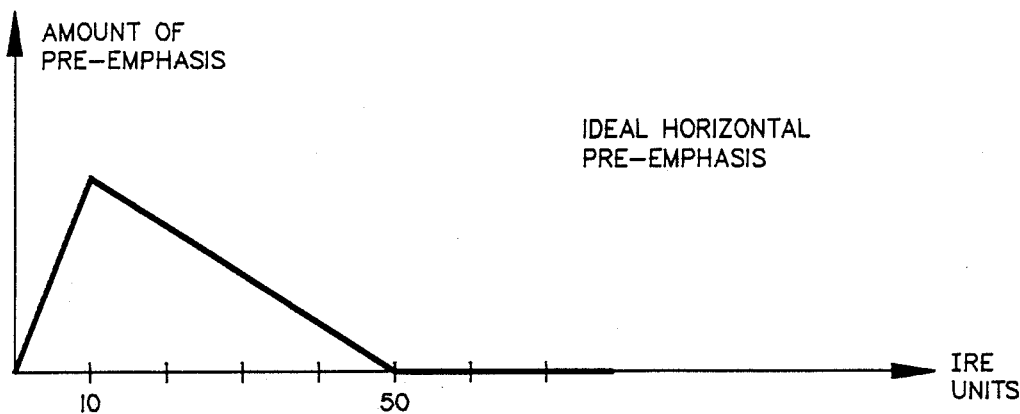
FIG. 9 is a graph of an idealized horizontal domain preemphasis curve characteristic.

FIG. 9 depicts an ideal horizontal preemphasis curve which shows a peak of preemphasis at about 10 IRE units and which ends at 50 IRE units. For signals above 50 IRE units, preferably no preemphasis is added, and no deemphasis is subtracted from the signal.

Figure 10:
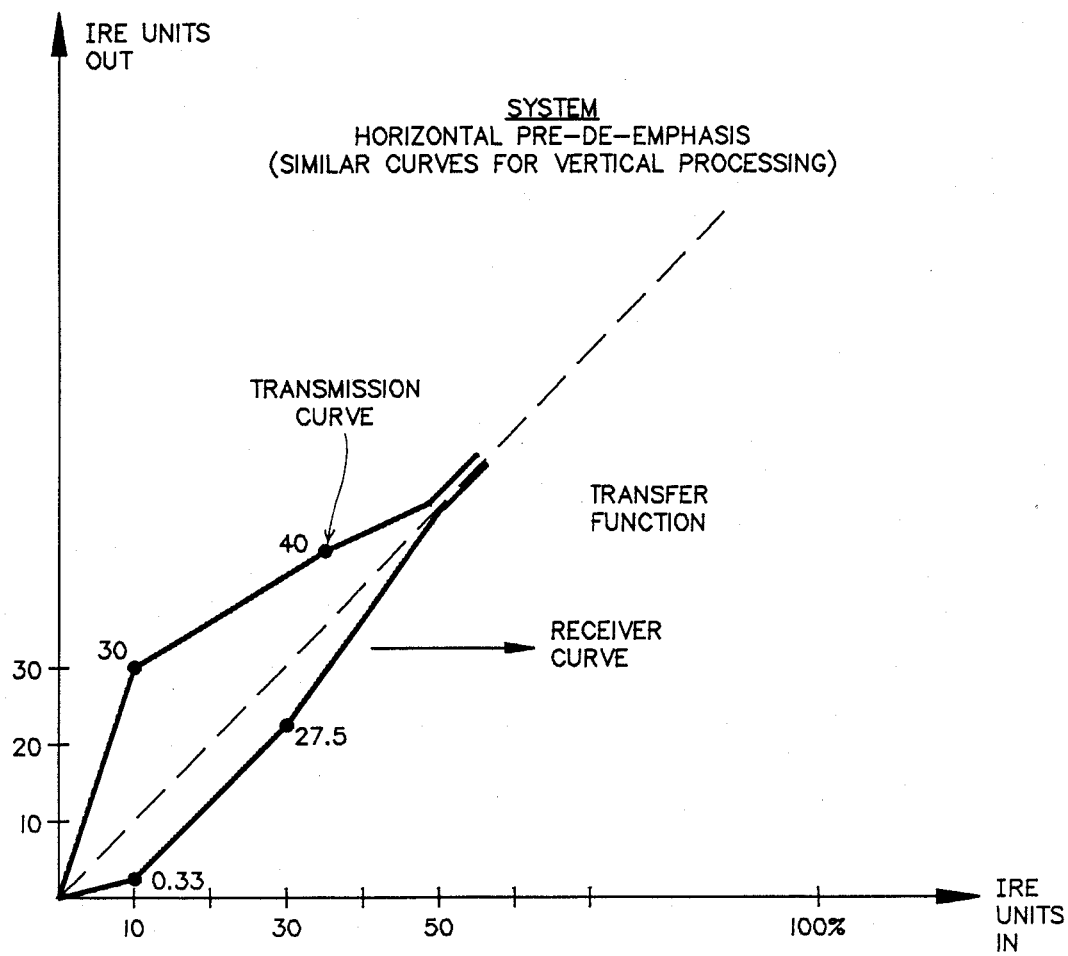
FIG. 10 is a graph of horizontal domain preemphasis/deemphasis characteristics for low level luminance high frequency components.

FIG. 10 depicts an overall system graph showing horizontal preemphasis and horizontal deemphasis. The preemphasis is labelled "transmission curve" and the deemphasis is labelled "receiver curve" in this figure. The product of the preemphasis and deemphasis curves yields the normalized video level signal graphed as a dashed line. Curves similar to the FIG. 9 and FIG. 10 curves apply to the vertical domain preemphasis and deemphasis processes.

Figure 11A:
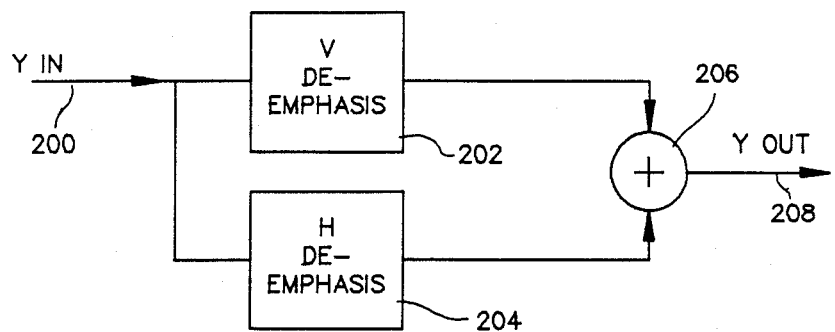
FIGS. 11A and 11B are simplified block diagrams of alternative decode de-emphasis circuitry.
Figure 11B:
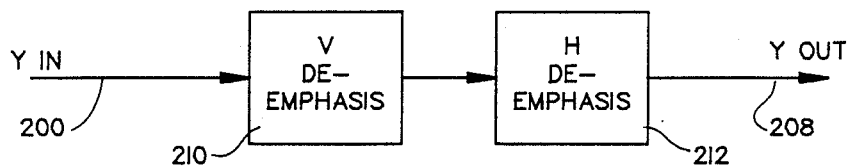

FIG. 11 A shows one implementation for a bidimensional deemphasis circuit. It includes a luminance input 200, a vertical deemphasis circuit 202 in parallel with a horizontal deemphasis circuit 204 (delay matching being understood). An adder circuit 206 combines the outputs of the circuits 202 and 204 and provides a bidimensionally deemphasized luminance signal at an output 208. A series arrangement of similar circuit elements is depicted in FIG. 11 B. The FIG. 11 B implementation eliminates the adder circuit element 206.

Figure 12:
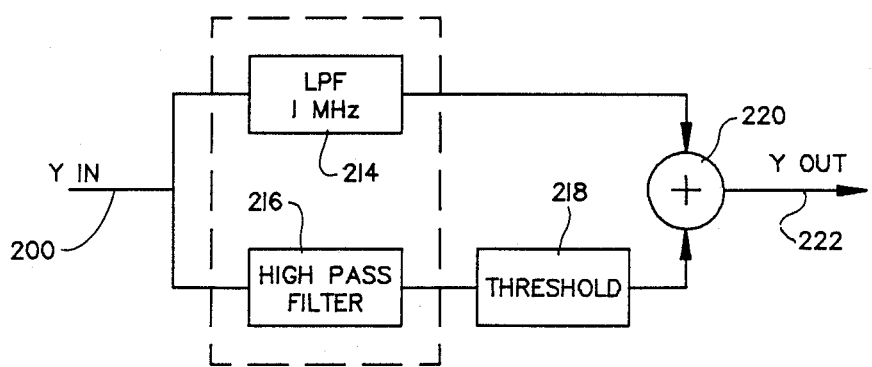
FIG. 12 is a block diagram of a horizontal domain deemphasis circuit.
Figure 13A:
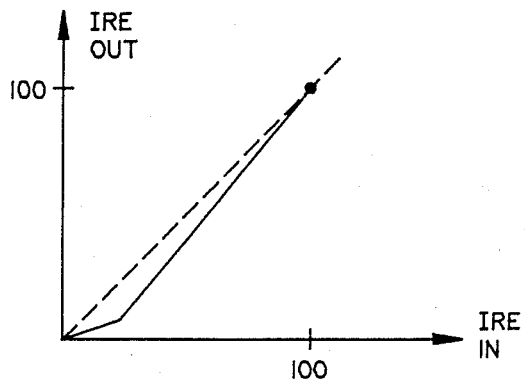
FIGS. 13A and 13B are two alternative functional performance graphs of the FIG. 12 horizontal deemphasis circuit.
Figure 13B:
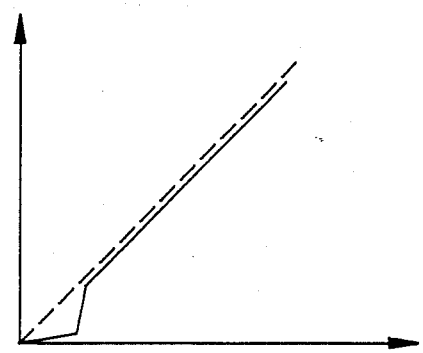

FIG. 12 illustrates one implementation of a horizontal domain deemphasis circuit. An input 200 receives preemphasized luminance taken from the transmission channel. This luminance signal is then passed through two filters 214 and 216. The filter 214 is a low pass filter having a cutoff at about 1 MHz, and a high pass filter 216 having a cutoff at about 1 MHz. The dashed box drawn around the filters 214 and 216 denotes that the passband characteristics of the filters 214 and 216 are complementary so that the outputs sum to unity, given a unity input. A threshold circuit 218 is connected to the output of the high pass filter 216, and the circuit 218 may in a simple, low cost implementation have the characteristic depicted in FIG. 13A and in a more elaborate and expensive implementation have the characteristic depicted in FIG. 13B. Performance wise, the FIG. 13B characteristic is preferred. The high pass filtered, threshold amplified high frequency luminance component is then summed with the low frequency luminance from the filter 214 in a summing circuit 220 and put out as horizontal domain deemphasized luminance at an output 222. A vertical deemphasis circuit using one or more line delay circuits in a fashion analogous to FIG. 6 of the referenced U.S. Pat. No. 4,262,304 works well for the vertical domain process.

To those skilled in the art to which this invention relates, many changes in construction and widely varying embodiments will suggest themselves without departing from the spirit and scope of this invention. The disclosures and the description herein are purely illustrative and are not intended to be in any sense limiting.

I claim:

1. A method for generating for transmission through a medium a wide band quadrature modulated color television signal spectrum with NTSC format compatibility, said method comprising the steps of:

generating an amplitude modulated radio frequency carrier, generating a first sideband of said carrier which includes limited bandwidth luminance information and which includes a quadrature modulated chroma subcarrier interleaved within said luminance information, adaptively preemphasizing low level signal transitions occurring in extended bandwidth luminance information, and generating a second sideband of said carrier comprising said adaptively preemphasized extended bandwidth luminance information without addition or presence of said chroma subcarrier.

2. The method set forth in claim 1 wherein said quadrature modulated chroma subcarrier is interleaved among high frequency energy groups of said limited bandwidth luminance information.

3. The method set forth in claim 1 further comprising the step of generating a frequency modulated audio subcarrier at a frequency spaced spectrally away from said amplitude modulated radio frequency carrier in the direction of said first sideband.

4. The method set forth in claim 1 wherein said step of adaptively preemphasizing low level signal transitions occurring in extended bandwidth luminance information comprises the steps of:

boosting low level transitions in the vertical domain within the extended bandwidth luminance information to provide a boosted vertical component, boosting low level transitions in the horizontal domain within the extended bandwidth luminance information to provide a boosted horizontal component, combining in proper time an unboosted component of the extended bandwidth luminance information with the boosted vertical component and with the boosted horizontal component.

5. A method for detecting a wide band quadrature modulated color television signal which is NTSC format compatible and which has been generated by the steps of generating an amplitude modulated radio frequency carrier; generating a first sideband of said carrier comprising limited bandwidth luminance information and quadrature modulated chroma subcarrier interleaved within said luminance information within said first sideband; adaptively preemphasizing low level signal transitions occurring in extended bandwidth luminance information, and generating a second sideband of said carrier comprising said adaptively preemphasized extended bandwidth luminance information without addition of said chroma subcarrier, said detection method comprising the steps of: separating said second sideband of said carrier from said first sideband of said carrier and detecting said second sideband in order to recover said extended bandwidth luminance information;

demodulating said quadrature modulated chroma subcarrier within said separated first sideband in order to recover chrominance information, deemphasizing said low level signal transitions in said detected extended bandwidth luminance information to put out restored extended bandwidth luminance information; and putting out said chrominance information and said restored extended bandwidth luminance information for further processing and display with a television picture display device.

6. Apparatus for generating for transmission through a medium a wide band quadrature modulated color television signal spectrum with NTSC format compatibility, said apparatus comprising:

carrier generator means for generating an amplitude modulated radio frequency carrier, first modulator means for generating a first sideband of said carrier comprising limited bandwidth luminance information, second modulator means for generating a quadrature modulated chroma subcarrier within said first sideband, preemphasis amplifier means for adaptively preemphasizing low level signal transitions occurring in extended bandwidth luminance information, and third modulator means for generating a second sideband of said carrier comprising said adaptively preemphasized extended bandwidth luminance information without addition of said chroma subcarrier.

7. Apparatus for detecting a wide band quadrature modulated color television signal which is NTSC format compatible and which has been generated by the steps of generating an amplitude modulated radio frequency carrier; generating a first sideband of said carrier comprising limited bandwidth luminance information and a quadrature modulated chroma subcarrier interleaved within said luminance information within said first sideband; adaptively preemphasizing low level signal transitions occurring in extended bandwidth luminance information, and generating a second sideband of said carrier comprising said adaptively preemphasized extended bandwidth luminance information without addition of said chroma subcarrier, said detection apparatus comprising:

sideband filter means for separating said second sideband of said carrier from said first sideband of said carrier, wide bandwidth luminance demodulator means connected to said sideband filter means for detecting said second sideband in order to recover said extended bandwidth luminance information;

chroma demodulator means for demodulating said quadrature modulated chroma subcarrier within said separated first sideband in order to recover and put out said quadrature modulated chrominance information, deemphasis amplifier means connected to said wide bandwidth luminance demodulator means for adaptively deemphasizing said low level signal transitions in said detected extended bandwidth luminance information in order to put out deemphasized extended bandwidth luminance information.

* * * * *